U.S. Patent Office
3,692,689
Patented Sept. 19, 1972

3,692,689
PHOSPHOR COMPRISING LANTHANUM CERIUM THORIUM PHOSPHATE
Mary V. Hoffman, South Euclid, Ohio, assignor to General Electric Company
No Drawing. Filed Mar. 25, 1971, Ser. No. 128,187
Int. Cl. C09k 1/36
U.S. Cl. 252—301.1 L                    8 Claims

ABSTRACT OF THE DISCLOSURE

Improved cerium-activated phosphate phosphors of lanthanum and cerium are provided by incorporating small but effective amounts of the thorium ion in the crystalline lattice of the phosphor. Superior luminescent properties are obtained in the phosphor by this means and the phosphors can be prepared by a method which is simpler and easier to control than presently in use. The improved phosphors are useful in cathode-ray tubes, lamps, X-ray image intensifier tubes and other applications.

BACKGROUND OF THE INVENTION

Cerium-activated phosphors of lanthanum and cerium are known which exhibit luminescent characteristics in the ultraviolet region of the spectrum. Specifically, the phosphor $LaPO_4:Ce$ is known and the crystallographic structure of both lanthanum phosphate and cerium phosphate has been determined as the monazite structure. It is also known to activate said monazite structure with the $Tb^{3+}$ ion to provide a green emission and that enhancement of the emission can be obtained by the presence of the $Ce^{3+}$ ion in the crystalline lattice of the phosphor. The presence of thorium ion in the phosphor $CePO_4:Tb^{3+}$ has also been reported but without mention of guantities involved or any advantages gained with said composition.

On the other hand, it is well recognized in the fields of general chemistry and solid-state chemistry that both chemical and physical properties of materials are very strongly dependent on the number, kinds, arrangements and interactions of atoms and ions which make up the final material composition. This is especially true with phosphor chemistry where in many cases the phosphor luminescence depends on the presence of a certain activator and on the host-activator interactions. The interactions of a particular host and a particular activator are peculiar to that phosphor. The luminescence or non-luminescence of a potential phosphor host material cannot be predicted with any reliable degree of certainty from performance of a given activator and different host material. Activator performances and different host materials differ too greatly in luminescence response. It follows that activators and host materials cannot be easily substituted to provide phosphors of predictable luminescence. As exemplary of important luminescent properties which cannot be predicted with certainty, the particular kind and wavelength of excitation energy to produce emission for a new phosphor and whether the emission response thereto will be of a strength and character having commercial acceptability are cited. As a result of such uncertainty, new phosphors having different and improved characteristics including emission wavelength and brightness are constantly being sought.

SUMMARY OF THE INVENTION

The present invention consists of crystalline phosphor compositions having a structural formula:

$$La_{1-x-y}Ce_xTh_{3/4y}PO_4$$

wherein $x$ varies between a small but effective amount for activation of the phosphor and 1.0, and $y$ varies between 0.0002 and approximately 0.025 so that activation of the phosphor takes place by the presence of the $Ce^{3+}$ ion in the crystalline phosphor matrix.

The common structure of $LaPO_4$ and $CePO_4$ is such that very small amounts of an ion having a 4+ valence can be naturally incorporated into the crystalline matrix, and when cerium is the only ion present in activator concentrations for crystalline phosphor compositions having the aforementioned matrix compositions, then some $Ce^{4+}$ ion will always be present in the lattice along with the desired $Ce^{3+}$ ion. The maximum brightness from

$$LaPO_4:Ce$$

is obtained when no $Ce^{4+}$ ion is present since this ion is non-luminescent and effectively competes with the $Ce^{3+}$ ion luminescent center for the exciting radiation absorbed by the structure. The absorption of this exciting energy by the $Ce^{4+}$ ion is sufficiently large to reduce the emission to about 10% of the maximum. The incorporation of the $Th^{4+}$ ion in the lattice effectively removes the $Ce^{4+}$ ion by occupying the crystal lattice sites that will accept a 4+ ion and thereby forcing the multivalent cerium ion to the 3+ valent state.

Phosphors having the above-described compositions are efficient light producers and exhibit an emission in the form of a double band peaking at 320 and 340 nm. wavelength in the ultraviolet spectrum when excited by ultraviolet, X-ray and cathode-ray radiation. The enhancement of emission intensity in the phosphor with the presence of the $Th^{4+}$ ion which occurs from removal of any $Ce^{4+}$ ions in the crystalline phosphor lattice is obtained for the $CePO_4$ composition with incorporation of thorium in amounts as low as 0.0005 mole per formula. In the cerium-activated $LaPO_4$ matrix, maximum enhancement of emission intensity for this phosphor composition is reached at about 0.003 mole of thorium. A similar enhancement is obtained in the $La_{1-x}Ce_xPO_4$ phosphor where $x$ increases to 1.0 thereby exhibiting the general effect of the $Th^{4+}$ ion upon the intensity of $Ce^{3+}$ ion emission. An improved phosphor of the invention having the general formula $La_{1-x-y}Ce_xTh_{3/4y}PO_4$ can have values of $x$ ranging from essentially zero to about 0.3 for maximum intensity although values up to $x=1$ are possible (i.e., $Ce_{1-y}Th_{3/4y}PO_4$) having the same emission peaks but reduced intensity. Values for $y$ can range from almost zero such as 0.0002 to about 0.025 although higher values are not deleterious to the luminescence.

Phosphor compositions of the invention can be prepared by techniques having significant benefits over methods now employed. More particularly, steps are taken with known methods to preclude formation of the $Ce^{4+}$ ion in the phosphor composition. In said methods, a cerium-activated phosphate of lanthanum is produced by coprecipitation as the phosphate, mixing the lanthanum and cerium carbonate with diammonium phosphate, or coprecipitating lanthanum and cerium carbonates together then mixing with phosphate. All of said preparations are followed by firing, generally in a non-oxidizing atmosphere to hopefully provide presence of cerium in the phosphor composition as $Ce^{3+}$ ion only. One such method calls for use of only acceptably pure grades of lanthanum and cerous compounds. High quality starting materials have not been available until recently nor were precise analytical methods used to determine the exact level of impurities. Further, there was considerable difference in impurity levels between different lots of the starting materials. Since certain impurities such as calcium are detrimental to the brightness of $LaPO_4$:Ce, it became necessary to test lots of the particular starting material to be employed in order to obtain one with a low enough impurity content often without recognizing what impurity content was desirable. More recently, better purification methods have been used by suppliers so that lanthanum and cerium compounds of higher purity are now being made available. The best grade of cerium now available is that of 99.999% ceric oxide but its use without practicing the present invention provides the undesirable $Ce^{4+}$ ion in the phosphor lattice.

In accordance with the teachings of the present invention, it now becomes possible to employ an improved ceric compound rather than the cerous compounds required by the prior art which are currently only available in a less pure grade. One prior art method also requires firing to produce the final phosphor in a reducing atomsphere supplied by a carbon container to further insure elimination of the $Ce^{4+}$ ion. This method does not permit effective control over the synthesis of the phosphor composition since the formation of other cerium oxides can also occur. This results in inclusion of a deleterious phase in the final phosphor product which is difficult to remove. By adopting the preparation techniques of the present invention, however, it becomes possible to conduct the firing operation entirely in air and the resulting phosphor is white and contains no deleterious inclusions.

It is an important object of the invention, therefore, to provide highly efficient luminscent materials suitable for excitation by ultraviolet, cathode-ray and X-ray radiation.

Another important object of the invention is to provide improved methods of preparing cerium-activated phosphate phosphors of lanthanum and cerium by a process which is easier to control and produce as a more uniform phosphor.

DESCRIPTION OF THE PREFERRED EMBODIMENTS

The applicant has discovered novel cerium-activated phosphate phosphors of lanthanum and cerium exhibiting significant improvement in the intensity of the $Ce^{3+}$ emission due to incorporation of $Th^{4+}$ ion in the crystalline phosphor matrix. These phosphors can be prepared using commercially available grades of lanthanum and cerium compounds such as those normally employed in phosphor production. When prepared from cerous and lanthanum sources, the phosphors are coprecipitated from nitrate solutions with $NaH_2PO_4H_2O$. When prepared from ceric oxide, said oxides are mixed with $(NH_4)_2HPO_4$ and fired initially at 300° C. A final firing operation is conducted with both methods of preparation in order to prepare crystals of the phosphor material having the desired degree of crystallinity and which consists of heating in air at approximately 1000° C. for several hours.

Emission intensity of the $Ce^{3+}$ ion in the monazite crystalline phosphor structures prepared in accordance with the above-summarized methods of the invention are reported in Table 1 below.

TABLE I

| x | y=0 | y=0.013 |
|---|---|---|
| 0.005 | 12.6 | 134 |
| 0.020 | 12.9 | 139 |
| 0.050 | 20.4 | 154 |
| 0.100 | 20.4 | 160 |

The $Ce^{3+}$ and $Th^{4+}$ ion concentrations reported in the above table are represented as moles per mole of formula in the $La_{1-x-y}Ce_xTh_{3/4y}PO_4$ general composition of the novel phosphors.

A preferred phosphor of the invention can be prepared having the formula $La_{0.972}Ce_{0.02}Th_{0.006}PO_4$ in accordance with the following examples.

EXAMPLE 1

The starting materials listed in tabular form below are employed as hereinafter described to prepare the above-mentioned phosphor composition.

| Material | Moles | Grams |
|---|---|---|
| $La_2O_3$ | 0.486 | 159 |
| $CeO_2$ | 0.020 | 3.44 |
| $ThO_2$ | 0.006 | 1.58 |
| $(NH_4)_2HPO_4$ | 1.100 | 145.3 |

The above-listed materials are mixed dry and fired at approximately 300° C. for several hours which decomposes the diammonium phosphate and initiates the phosphor-producing reaction. The product is then ground and refired at approximately 1000° C. for several hours in air. The excess phosphate volatilizes during the latter firing step and leaves no residue. Said phosphate is used to flux the reaction and provides better uniformity so that negligible unreacted oxides remain.

EXAMPLE 2

The following listed raw materials are employed to prepare a phosphor having approximately the same composition as provided in Example 1.

| Material | Moles | Grams |
|---|---|---|
| $La_2O_3$ | 0.486 | 159 |
| $Th(NO_3)_4 \cdot 4H_2O$ | 0.006 | 3.31 |
| $Ce(NO_3)_3 \cdot 6H_2O$ | 0.020 | 8.69 |
| $NaH_2PO_4$ | 1.000 | 138 |

The $La_2O_3$ is dissolved in an acid such as nitric acid and the thorium and cerous nitrates are dissolved in water with the solutions being combined and adjusted to a pH of approximately 5 with ammonium hydroxide. Sodium phosphate is added and the resultant precipitate is filtered, washed and dried. The product is then fired at approximately 1000° C. for several hours in air to provide the final phosphor composition.

It will be appreciated in either of the above-described processes that a phosphor crystal is coprecipitated from the reaction mixture with the $Ce^{3+}$ ion activator. During the final firing step recrystallization of the phosphor product takes place to provide a better crystalline luminescent material of the invention. It should also be appreciated that other starting materials than oxides of lanthanum, cerium and thorium can be used to prepare phosphors of the invention by the above-described techniques so long as the purity levels before specified are not exceeded. It is intended to limit the present invention, therefore, only to the scope of the following claims.

What I claim as new and desire to secure by Letters Patent of the United States is:

1. A crystalline phosphor composition having the structural formula:

$$La_{1-x-y}Ce_xTh_{3/4y}PO_4$$

wherein $x$ varies from a small but effective amount for activation of the phosphor to 1.0 and $y$ varies from 0.0002 to approximately 0.025.

2. A crystalline phosphor composition as in claim 1 in which $y$ varies from 0.0002 to approximately 0.025.

3. A crystalline phosphor composition as in claim 1 in which $x$ varies up to approximately 0.3.

4. A crystalline phosphor composition as in claim 2 in which $x$ varies between 0.0005 and 0.30.

5. A crystalline phosphor composition as in claim 1 in which $x$ varies between 0.05 and 0.20.

6. A crystalline phosphor composition as in claim 1 in which $y$ varies between 0.004 and 0.020.

7. The crystalline phosphor $LaPO_4:Ce^{3+}$ having $Th^{4+}$ ions present in the crystalline matrix.

8. A method of preparing cerium-activated orthophosphate phosphors of cerium and lanthanum, comprising:

(1) reacting a mixture of oxide of lanthanum, cerium and thorium or compounds which decompose to produce such compounds using amounts of the selected lanthanum, cerium and thorium material sufficient to produce the phosphor $La_{1-x-y}Ce_xTh_{3/4y}PO_4$ wherein $x$ varies between a small but effective amount for activation of the phosphor and 1.0, and $y$ varies between 0.0002 and approximately 0.025 with an excess amount of a phosphate compound, and (2) heating the phosphor under oxidizing conditions at sufficiently elevated temperatures to recrystallize the phosphor and remove the excess phosphate compound.

References Cited

UNITED STATES PATENTS

| | | | |
|---|---|---|---|
| 3,314,893 | 4/1967 | Hoffman | 252—301.1 L |
| 3,560,397 | 2/1971 | Avella | 252—301.1 L |
| 3,580,860 | 5/1971 | Sarver et al. | 252—301.1 L |

LELAND A. SEBASTIAN, Primary Examiner